(12) United States Patent
Anthony et al.

(10) Patent No.: US 11,167,374 B2
(45) Date of Patent: Nov. 9, 2021

(54) THREE-DIMENSIONAL (3D) PRINTING

(71) Applicant: Hewlett-Packard Development Company, L.P., Houston, TX (US)

(72) Inventors: Thomas Anthony, Palo Alto, CA (US); Kristopher J. Erickson, Palo Alto, CA (US); Krzysztof Nauka, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 366 days.

(21) Appl. No.: 16/098,075

(22) PCT Filed: Jul. 26, 2016

(86) PCT No.: PCT/US2016/044095
§ 371 (c)(1),
(2) Date: Oct. 31, 2018

(87) PCT Pub. No.: WO2018/022024
PCT Pub. Date: Feb. 1, 2018

(65) Prior Publication Data
US 2019/0143453 A1   May 16, 2019

(51) Int. Cl.
*B23K 26/342* (2014.01)
*B33Y 70/00* (2020.01)
(Continued)

(52) U.S. Cl.
CPC ............ *B23K 26/342* (2015.10); *B22F 12/00* (2021.01); *B23K 26/0006* (2013.01);
(Continued)

(58) Field of Classification Search
None
See application file for complete search history.

(56) References Cited

U.S. PATENT DOCUMENTS

| 2007/0238056 A1 | 10/2007 | Baumann et al. |
| 2007/0240222 A1 | 10/2007 | Tuvell |

(Continued)

FOREIGN PATENT DOCUMENTS

| CN | 1852803 | 10/2006 |
| CN | 1976799 | 6/2007 |

(Continued)

OTHER PUBLICATIONS

Halterman, TE, NIST Releases Additive Manufacturing Metal Powder Report to Hopefully Improve Manufacturing, Apr. 15, 2015, < https://3dprint.com/58276/nist-powder-bed-report/ >.

*Primary Examiner* — John J Norton
(74) *Attorney, Agent, or Firm* — Dierker & Kavanaugh PC

(57) ABSTRACT

In a three-dimensional printing method example, a metallic build material is applied. A positive masking agent is selectively applied on at least a portion of the metallic build material. The positive masking agent includes a radiation absorption amplifier that is compatible with the metallic build material. The metallic build material is exposed to radiation from a spatially broad, high energy light source to melt the portion of the metallic build material in contact with the positive masking agent to form a layer. The radiation absorption amplifier i) has an absorbance for the radiation that is higher than an absorbance for the radiation of the metallic build material, or ii) modifies a surface topography of the at least the portion of the metallic build material to reduce specular reflection of the radiation off of the at least the portion of the metallic build material, or both i) and ii).

10 Claims, 4 Drawing Sheets

(51) Int. Cl.
  *B33Y 10/00*     (2015.01)
  *B33Y 30/00*     (2015.01)
  *C22C 1/04*      (2006.01)
  *B22F 12/00*     (2021.01)
  *B33Y 50/02*     (2015.01)
  *B23K 26/0622*   (2014.01)
  *B23K 26/352*    (2014.01)
  *B23K 26/00*     (2014.01)
  *B23K 26/06*     (2014.01)
  *B23K 26/08*     (2014.01)
  *B23K 26/14*     (2014.01)
  *B23K 26/18*     (2006.01)
  *B22F 10/10*     (2021.01)

(52) U.S. Cl.
  CPC ...... B23K 26/0617 (2013.01); B23K 26/0622 (2015.10); B23K 26/0869 (2013.01); B23K 26/147 (2013.01); B23K 26/18 (2013.01); B23K 26/355 (2018.08); B33Y 10/00 (2014.12); B33Y 30/00 (2014.12); B33Y 50/02 (2014.12); B33Y 70/00 (2014.12); C22C 1/04 (2013.01); B22F 10/10 (2021.01); B22F 2999/00 (2013.01); Y02P 10/25 (2015.11)

(56) References Cited

U.S. PATENT DOCUMENTS

| | | |
|---|---|---|
| 2007/0241482 A1 | 10/2007 | Giller et al. |
| 2014/0227123 A1 | 8/2014 | Gunster et al. |
| 2015/0132173 A1 | 5/2015 | Bruck et al. |
| 2015/0273765 A1* | 10/2015 | Kato ............... B29C 64/165 428/413 |
| 2015/0366073 A1 | 12/2015 | Magdassi et al. |
| 2017/0015064 A1* | 1/2017 | Potter ............. B29C 64/165 |
| 2017/0015065 A1* | 1/2017 | Potter ............. B29C 70/882 |
| 2017/0355137 A1* | 12/2017 | Ederer ............ B29C 64/165 |
| 2018/0369910 A1* | 12/2018 | Gunther .......... B29C 64/209 |

FOREIGN PATENT DOCUMENTS

| | | |
|---|---|---|
| CN | 105492145 | 4/2016 |
| RU | 2080963 | 6/1997 |
| TW | 201620719 | 6/2016 |
| TW | 201622954 | 7/2016 |
| WO | WO-2015001241 | 1/2015 |
| WO | WO-2015056230 A1 | 4/2015 |
| WO | WO-2015106816 A1 | 7/2015 |
| WO | WO-2015200280 | 12/2015 |
| WO | WO-2016057034 | 4/2016 |
| WO | WO-2016072966 | 5/2016 |

\* cited by examiner

THREE-DIMENSIONAL (3D) PRINTING

BACKGROUND 3D printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
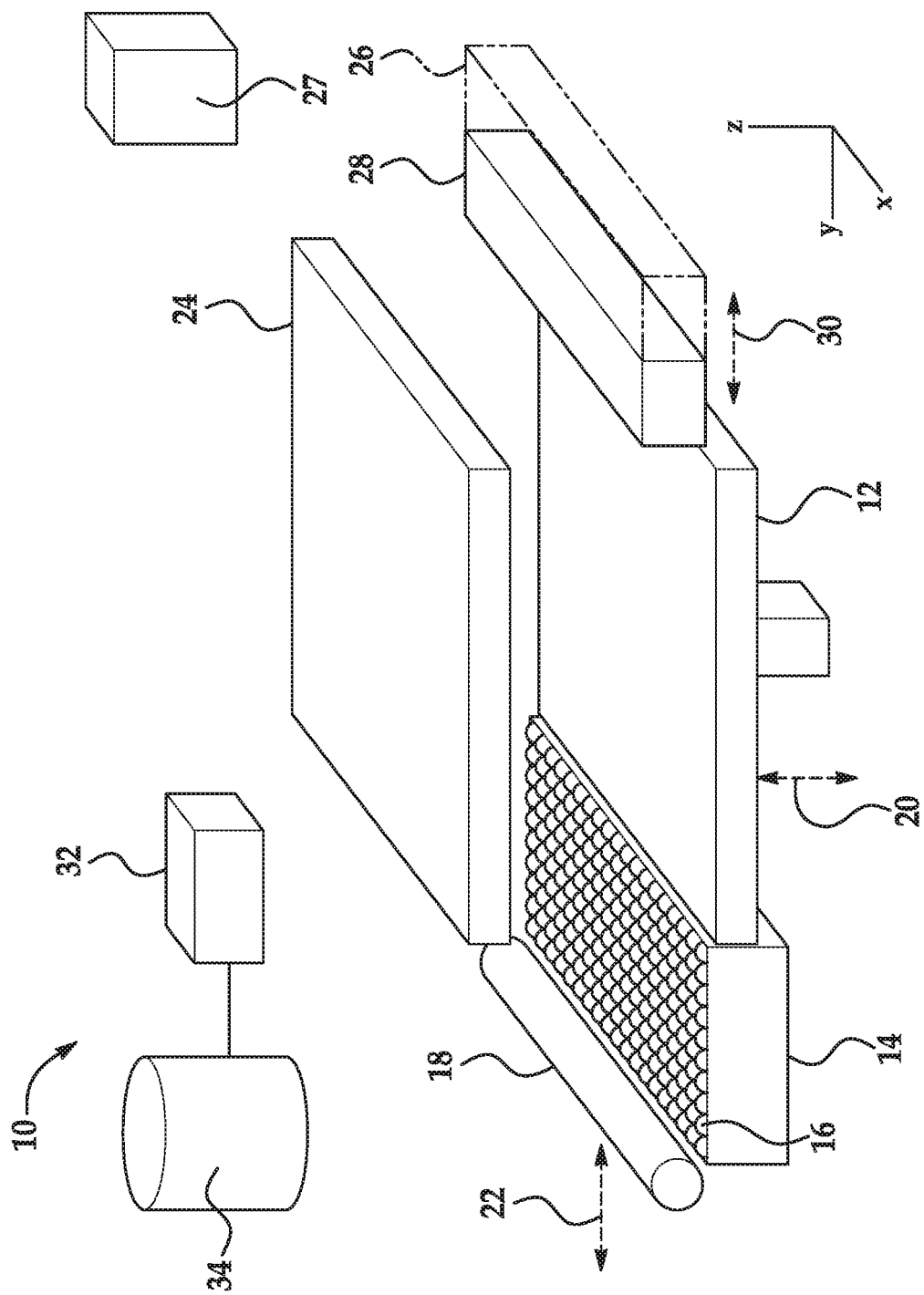
FIG. 1 is a simplified isometric view of an example of a 3D printing system disclosed herein.

Examples of the three-dimensional (3D) printing method and the 3D printing system disclosed herein utilize Multi Jet Fusion (MJF). During Multi Jet Fusion, an entire layer of a build material (also referred to as build material particles) is exposed to radiation, but a selected region (in some instances less than the entire layer) of the build material is fused and hardened to become a layer of a 3D part.

In the examples disclosed herein, a positive masking agent is selectively deposited in contact with the selected portion/region of a metallic build material. The positive masking agent(s) may be capable of absorbing radiation and converting the absorbed radiation to thermal energy, and/or modifying the surface topography of the metallic build material to reduce specular reflection of radiation off of the metallic build material. When the positive masking agent is capable of absorbing radiation and converting the absorbed radiation to thermal energy, the thermal energy is transferred to the metallic build material and the metallic build material that is in contact with the positive masking agent melts. When the positive masking agent is capable of modifying the surface topography of the metallic build material to reduce specular reflection of radiation off of the metallic build material, the metallic build material with the modified surface topography is capable of absorbing enough radiation and converting enough of the absorbed radiation to thermal energy to melt. In either case, the melting of the metallic build material causes the metallic build material to fuse, bind, cure, etc. to form the layer of the 3D part.

As used herein, the terms "3D printed part," "3D part," or "part" may be a completed 3D printed part or a layer of a 3D printed part.

Examples of the 3D printing method and 3D printing system disclosed herein utilize the positive masking agent, which contains a radiation absorption amplifier that may be dispersed in an aqueous or non-aqueous vehicle. The positive masking agent, including the radiation absorption amplifier, allows for control and amplification of the absorption of the radiation to which the metallic build material is exposed. As a result of this control and amplification, the portion of the metallic build material to which the positive masking agent is applied melts to form a layer of the 3D part, and the portion of the metallic build material to which the positive masking agent is not applied does not melt.

The positive masking agent may be a liquid. In one example, the positive masking agent disclosed herein includes a liquid vehicle and the radiation absorption amplifier. In some examples, the positive masking agent consists of these components with no other components.

As used herein, "liquid vehicle," and "vehicle" may refer to the liquid fluid in which the radiation absorption amplifier is placed to form the positive masking agent. A wide variety of vehicles may be used with the positive masking agent and methods of the present disclosure. The vehicle may include water alone, a master/primary solvent alone, or water or a master solvent in combination with a mixture of a variety of additional components. Examples of these additional components may include organic co-solvent(s), surfactant(s), antimicrobial agent(s), anti-kogation agent(s) (for thermal inkjet formulations), and/or chelating agent(s). One example vehicle includes water, co-solvent(s), and surfactant(s). In any of the examples disclosed herein, the co-solvent(s) may be used to improve reliability, nozzle health, and decap performance (i.e., the ability of the fluid to readily eject from a printhead, upon prolonged exposure to air), and the surfactant(s) may be used to quickly wet the metallic build material.

The water-based or master solvent-based vehicle may include an organic co-solvent present, in total in the positive masking agent, in an amount ranging from about 1 wt % to about 50 wt % (based on the total wt % of the positive masking agent), depending, at least in part, on the jetting architecture that is to be used to dispense the positive masking agent. In an example, the co-solvent is present in the positive masking agent in an amount of about 10 wt % based on the total wt % of the positive masking agent. It is to be understood that other amounts outside of this example and range may also be used. Examples of suitable co-solvents include high-boiling point solvents (some of them may also have a humectant functionality), which have a boiling point of at least 120° C. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the vehicle may include 1-(2-hydroxyethyl)-2-pyrrolidone.

As mentioned above, the vehicle may also include surfactant(s). Any water-soluble surfactant may be used for the water-based vehicle, and any surfactant that is soluble in the master solvent may be used for the master solvent-based vehicle. As an example, the positive masking agent may include non-ionic, cationic, and/or anionic surfactants, which may be present in an amount ranging from about 0.01 wt % to about 5 wt % based on the total wt % of the positive masking agent. In at least some examples, the vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof. In an example, the positive masking agent may include a total amount of antimicrobial agents that ranges from about 0.1 wt % to about 0.25 wt %.

When the positive masking agent is to be applied via thermal inkjet applications, an anti-kogation agent may also be included in the vehicle. Kogation refers to the deposit of dried ink (or dried positive masking agent) on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the positive masking agent in an amount ranging from about 0.1 wt % to about 1 wt % of the total wt % of the positive masking agent.

The vehicle may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the positive masking agent may range from 0 wt % to about 1 wt % based on the total wt % of the positive masking agent.

The balance of the vehicle is water or the master solvent. As such, the amount of water or master solvent may vary depending upon the weight percent of the other positive masking agent components.

In an example, the water is deionized water.

Examples of the master solvent may be water-soluble solvents or non-aqueous solvents, such as lower polarity solvents or non-polar solvents. Examples of water-soluble solvents with polar groups include primary aliphatic alcohols, secondary aliphatic alcohols, 1,2-alcohols, 1,3-alcohols, 1,5-alcohols, primary aliphatic amines, secondary aliphatic amines, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the master solvent may be 1-(2-hydroxyethyl)-2-pyrrolidone. In other cases, the master solvent may be based on lower polarity or non-polar solvents, both of which have poor water solubility. Examples of lower polarity or non-polar solvents include aliphatic, cyclic aliphatic or aromatic hydrocarbons. Water insoluble fatty alcohols, esters, ketones, ethers and other liquid (at ambient temperatures) oxidizable organic species are suitable candidates for non-aqueous formulations, especially for piezo applications. It may be desirable that any of the master solvents disclosed herein have a boiling temperature that is higher than water. However, it is contemplated that a master solvent with a boiling temperature that is lower than water may be used.

The positive masking agent also includes the radiation absorption amplifier. The radiation absorption amplifier is compatible with the metallic build material. If the radiation absorption amplifier is not compatible with the metallic build material, the radiation absorption amplifier may dissolve or penetrate into the build material upon melting and may contaminate the metallic build material. If the metallic build material is contaminated with the radiation absorption amplifier, the resulting 3D printed part may have a solid residue on its surface and/or an unwanted material (e.g., a material that will have a deleterious effect on the mechanical properties of the resulting 3D printed part) incorporated into the metal. As used herein, the radiation absorption amplifier may be compatible with the metallic build material by being or decomposing to a metallic material that is the same as the metallic build material or by being or decomposing to a material that forms an alloy with the metallic build material. The compatible radiation absorption amplifier remains in the printed part without deleteriously affecting the properties of the printed part.

The radiation absorption amplifier also allows the metallic build material to which the positive masking agent is applied to melt when the metallic build material is exposed to radiation. The radiation absorption amplifier may have an absorbance, for the radiation to which the metallic build material is exposed, that is higher than the absorbance of the metallic build material. The radiation absorption amplifier may also be or may alternatively be capable of modifying the surface topography of the metallic build material to which it is applied, in order to reduce specular reflection of radiation off of the metallic build material.

In the examples in which the radiation absorption amplifier has an absorbance (for the radiation to which the metallic build material is exposed) that is higher than the absorbance of the metallic build material, the radiation absorption amplifier has a high enough absorbance to absorb and convert enough radiation to thermal energy to melt the metallic build material. The absorbance of the metallic build material is low enough that the metallic build material does not, on its own, absorb enough radiation to melt. In some examples, the absorbance of the radiation absorption amplifier is from about 1.7 to about 2.5 times higher than the absorbance of the metallic build material, although combinations of the radiation absorption amplifier and the metallic build material with smaller or larger differences between absorbance may also be used. Dark metal powders, such as powders of stainless steel, iron, or titanium, may absorb from about 60% to about 75% of the radiation (e.g., for radiation having a wavelength ranging from about 400 nm to about 900 nm). Light metal powders, such as powders of aluminum or copper, may absorb from about 20% to about 35% of the radiation (e.g., for radiation having a wavelength ranging from about 400 nm to about 900 nm). In some examples, carbon particles may absorb about 80% of the radiation (e.g., when the carbon particles form a black layer on the metallic build material). In some other examples, silicon particles may absorb about 98% of the radiation (e.g., when the silicon particles form a rough, black layer on the metallic build material). The radiation absorption amplifier may also be selected to increase the absorbance of the metallic build material by at least 20% (e.g., by having an absorbance that is at least 20% higher than the absorbance of the metallic build material). Since temperature rise is roughly proportional to absorbance, increasing the absorbance by at least 20% will increase the temperature by about 20% or more. As such, when exposed to the same radiation intensity, the metallic build material in contact with the radiation absorption amplifier will be heated to or above its melting point and the unexposed metallic build material will not reach its melting point.

In the examples in which the radiation absorption amplifier is capable of modifying the surface topography of the metallic build material to which it is applied to reduce specular reflection of radiation off of the metallic build material, the metallic build material with the modified surface topography is capable of absorbing and converting enough radiation to thermal energy to melt. The metallic build material with unmodified surface topography is unable to absorb and convert enough radiation to thermal energy to melt because of its higher degree of specular reflection. In some examples, the specular reflection is sufficiently reduced so that the metallic build material with the modified surface topography absorbs from about 1.7 to about 2.5 times the radiation absorbed by the metallic build material with unmodified surface, although radiation absorption amplifiers that reduce the specular reflection to lesser or greater extent may also be used. The modification to the surface topography may also increase the absorbance of the metallic build material by at least 20%. As noted above, temperature rise is roughly proportional to absorbance, and thus increasing the absorbance by at least 20% will increase the temperature by about 20% or more. As such, when exposed to the same radiation intensity, the metallic build material with the modified surface topography will be heated to or above its melting point and the unmodified metallic build material will not reach its melting point.

Examples of the radiation absorption amplifier include carbon, silicon, metal nanoparticles, metal salts, and combinations thereof.

When the radiation absorption amplifier is carbon, silicon, or a combination thereof, the absorbance (for the radiation to which the metallic build material is exposed) of the radiation absorption amplifier (i.e., carbon, silicon, or a combination thereof) is higher than the absorbance of the metallic build material. In these examples, the radiation absorption amplifier (i.e., carbon, silicon, or a combination thereof) is compatible with the metallic build material by forming an alloy with the metallic build material.

When the radiation absorption amplifier includes metal nanoparticles or metal salts, the radiation absorption amplifier has an absorbance (for the radiation to which the metallic build material is exposed) that is higher than the absorbance of the metallic build material and/or is capable of modifying the surface topography of the metallic build material to which it is applied. When the metal nanoparticles and/or metal salts have a higher absorbance than the metallic build material, the radiation absorption amplifier (i.e., the metal nanoparticles and/or metal salts) is compatible with the metallic build material by being or decomposing to a material that forms an alloy with the metallic build material. When the metal nanoparticles and/or metal salts are capable of modifying the surface topography of the metallic build material, the radiation absorption amplifier (i.e., the metal nanoparticles and/or metal salts) may be compatible with the metallic build material by being or decomposing to a metallic material that is the same as the metallic build material or by being or decomposing to a material that forms an alloy with the metallic build material.

In an example, the radiation absorption amplifier is a metal salt which modifies the surface topography of the metallic build material by decomposing to a metal, and thereby forming a porous coating of the metal on the portion of the metallic build material to which the positive masking agent is applied. The porous coating of the metal reflects less radiation than the metallic build material. The porosity of the porous coating is higher than the porosity of the layer of the metallic build material. The additional radiation absorbed by the porous metal coating allows the porous metal coating and the metallic build material upon which the porous metal coating is formed to melt/fuse to form a layer of the 3D part.

The decomposition of the metal salt into a metal may be accomplished by exposing the metallic build material (having the positive masking agent applied thereto) to radiation from a low energy light source or by heating the metallic build material. In an example, the decomposition of the metal salt into a metal is accomplished at a temperature ranging from about 150° C. to about 400° C. Examples of suitable metal salts include copper formate, nickel formate, copper oxalate, nickel oxalate, cobalt oxalate, iron oxalate, and combinations thereof. As examples, copper formate decomposition occurs at about 150° C., while nickel, cobalt, or iron oxalate decomposition occurs at about 400° C.

In some examples, the decomposition of the metal salt may be accomplished in an environment containing an inert gas and/or a low reactivity gas so that the metal salt decomposes to the metal rather than undergoing an alternate reaction which could form a product that fails to amplify the radiation absorption of the metallic build material and/or is incompatible with the metallic build material. Any inert or low reactivity gas may be used, such as nitrogen gas, helium gas, argon gas, or a combination thereof. In some examples, the decomposition of the metal salt may be accomplished in an environment containing a reducing gas to aid in the decomposition of the metal salt. The reducing gas may be, for example, forming gas, i.e., nitrogen gas with about 5% hydrogen gas.

In some examples, the decomposition of the metal salt may generate/produce the metal and a gaseous byproduct. The gaseous byproduct may help create the pores in the porous metal coating. Gaseous byproduct(s) may be removed from the system using a flowing purge gas or some other suitable gas removal mechanism.

An example of a metal salt that decomposes to a metal is copper (II) formate. The thermal decomposition of copper (II) formate involves a number of chemical reactions—and one of the predominant reactions may produce elemental copper, formic acid, and carbon dioxide:

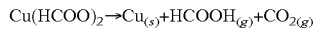

The formic acid and carbon dioxide produced by the thermal decomposition of copper (II) formate are in the gas phase at the decomposition temperature (e.g., 150° C.-250° C.). In this example, the copper produced is solid at the decomposition temperature. The copper may then be melted (by absorbing radiation from the spatially broad, high energy light source) with a copper build material to form a copper part, or the copper may be melted (by absorbing radiation from the spatially broad, high energy light source) with a metallic build material that includes a non-copper metal to form an alloy part.

In an example, the radiation absorption amplifier includes metal nanoparticles which modify the surface topography of the metallic build material by creating a rough surface coating of the metal nanoparticles on the portion of the metallic build material to which the positive masking agent is applied. The rough surface coating of the metal nanoparticles reflects less radiation/absorbs more radiation than the metallic build material. This is due, in part, to the absorption of scattered/reflected light that is bouncing within the rough surface coating. The additional radiation absorbed by the rough surface metal coating allows the rough surface coating of the metal nanoparticles and the metallic build material upon which the rough surface coating is formed to melt/fuse to form a layer of the 3D part. Examples of suitable nanoparticles that may be used as the radiation absorption amplifier include nanoparticles of platinum group metals (i.e., ruthenium, rhodium, palladium, osmium, iridium, and platinum), and group 11 metals (i.e., copper, silver, gold), nickel, iron, tin, and indium.

The radiation absorption amplifier may be present in the positive masking agent in an amount ranging from about 1 wt % to about 50 wt % of the positive masking agent. When the radiation absorption amplifier includes the metal salt, the radiation absorption amplifier may be present in the positive masking agent in an amount ranging from about 5 wt % to about 30 wt % or from about 10 wt % to about 20 wt % of the positive masking agent. When the radiation absorption amplifier includes the metal nanoparticles, the radiation absorption amplifier may be present in the positive masking agent in an amount ranging from about 10 wt % to about 50 wt % of the positive masking agent. When the radiation absorption amplifier includes carbon and/or silicon, the radiation absorption amplifier may be present in the positive masking agent in an amount ranging from about 2.5 wt % to about 20 wt % of the positive masking agent. In an example, the amount of the radiation absorption amplifier incorporated into the final 3D printed metal part ranges from about 0.1 atomic % to about 10 atomic % of the metallic build material. The radiation absorption amplifier loadings may be selected to provide a balance between the positive masking agent having jetting reliability and radiation absorption amplification efficiency. Additionally, the radiation absorption amplifier(s) selected and the amount of the radiation absorption amplifier(s) to be incorporated into the positive masking agent may be based on the metal or alloy from which the 3D part is to be formed and/or desirable mechanical properties for the 3D part.

Any of the radiation absorption amplifiers that are soluble in the selected vehicle (e.g., metal salts) do not require a dispersing agent.

Any of the radiation absorption amplifiers that are present in the positive masking agent as solid particles (e.g., carbon, silicon, and metal nanoparticles) may include a dispersing species/agent. Examples of suitable dispersing species may be polymer or small molecule dispersants, or other suitable dispersants. Alternatively, dispersing function may be achieved with charged groups attached to the surface of the radiation absorption amplifier. The dispersing agent or charged groups help to uniformly distribute the radiation absorption amplifier throughout the positive masking agent. Some examples of suitable dispersing agents include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.) or water-soluble styrene-maleic anhydride copolymers/resins.

When utilized, the dispersing agent may be present in an amount ranging from about 0.1% to about 40% of the total weight of the radiation absorption amplifier. The amount of the dispersing agent included in the positive masking agent may depend, in part, on the weight of the solid particles of the radiation absorption amplifier that are to be dispersed. When the radiation absorption amplifier is a lighter solid (e.g., carbon), the dispersing agent may be present in an amount ranging from about 5% to about 30% of the total weight of the radiation absorption amplifier. When the radiation absorption amplifier is a heavier solid (e.g., gold), the dispersing agent may be present in an amount ranging from about 0.5% to about 3% of the total weight of the radiation absorption amplifier.

In examples of the 3D printing system and method disclosed herein, it is to be understood that one positive masking agent may be used to amplify the absorption of radiation of the metallic build upon which it is applied. It is also to be understood that multiple positive masking agents may be mixed at the same area of the metallic build material or multiple positive masking agents may be applied to different areas of the build material to amplify the absorption of radiation of the metallic build material.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing metallic build material particles 16, and a build material distributor 18.

The build area platform 12 receives the metallic build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 2A:
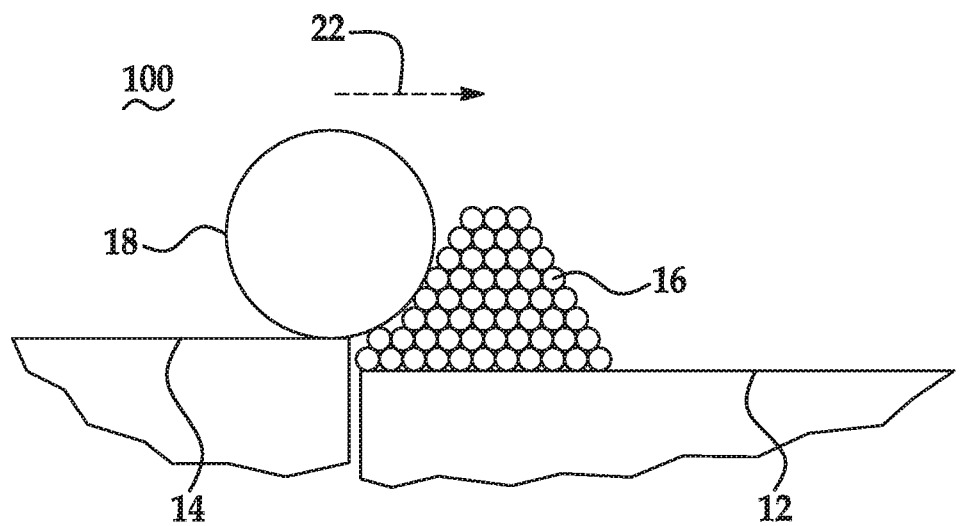
FIGS. 2A through 2E are schematic views depicting the formation of a 3D object using examples of a 3D printing method disclosed herein.
Figure 2B:
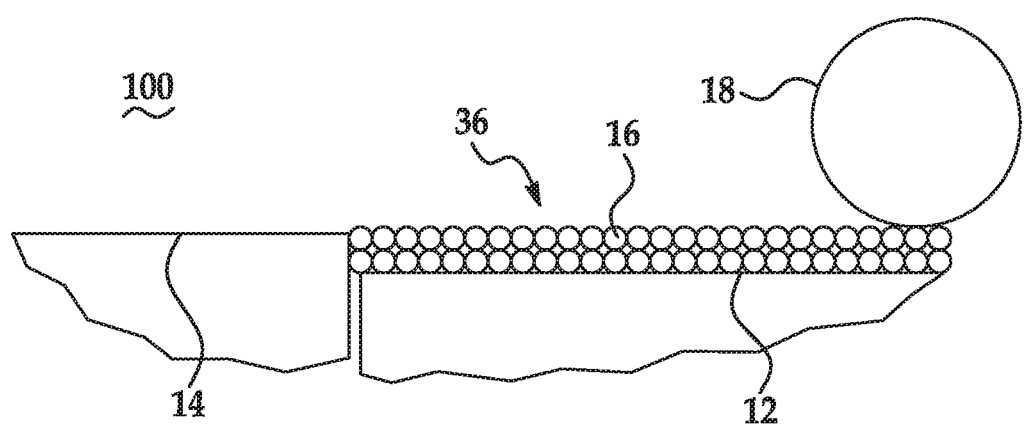
Figure 2C:
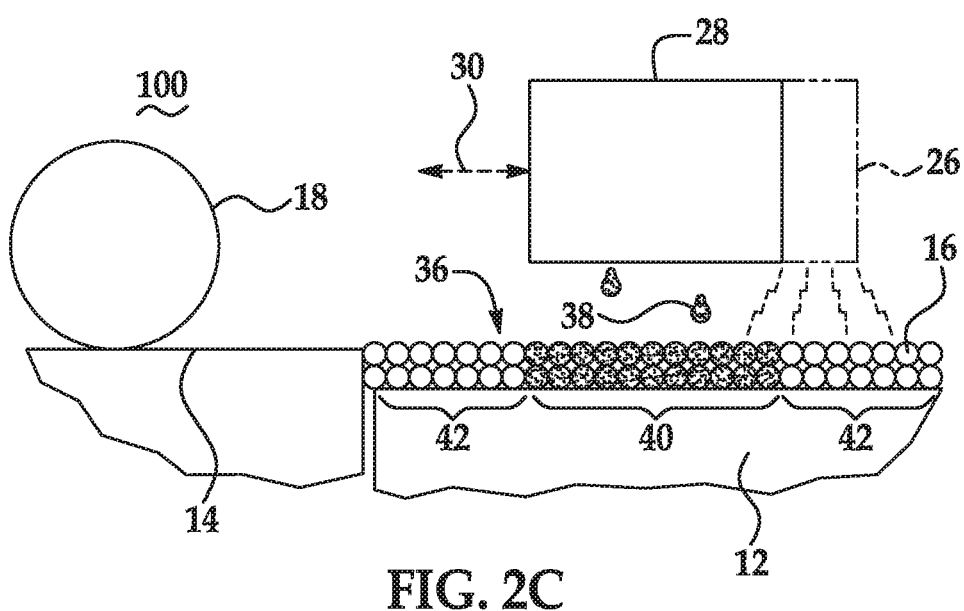
Figure 2D:
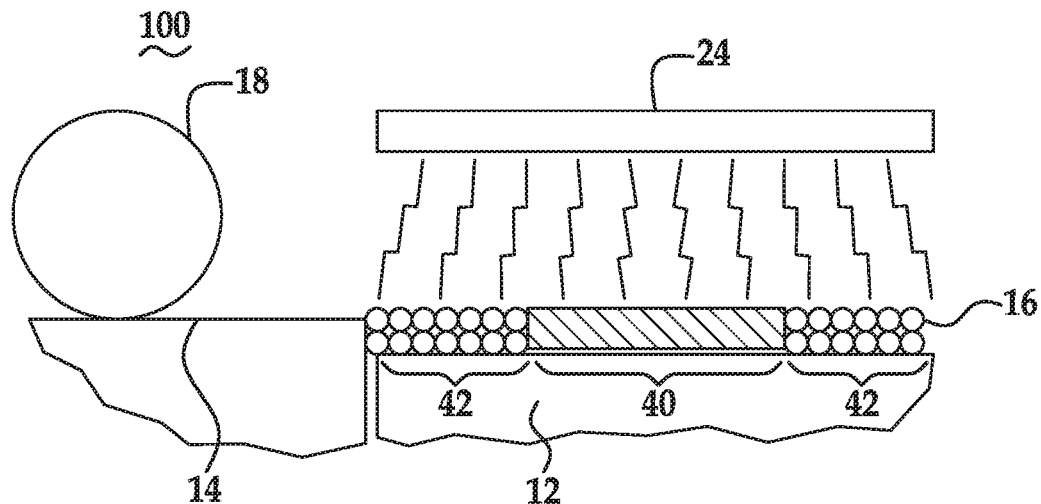
Figure 2E:
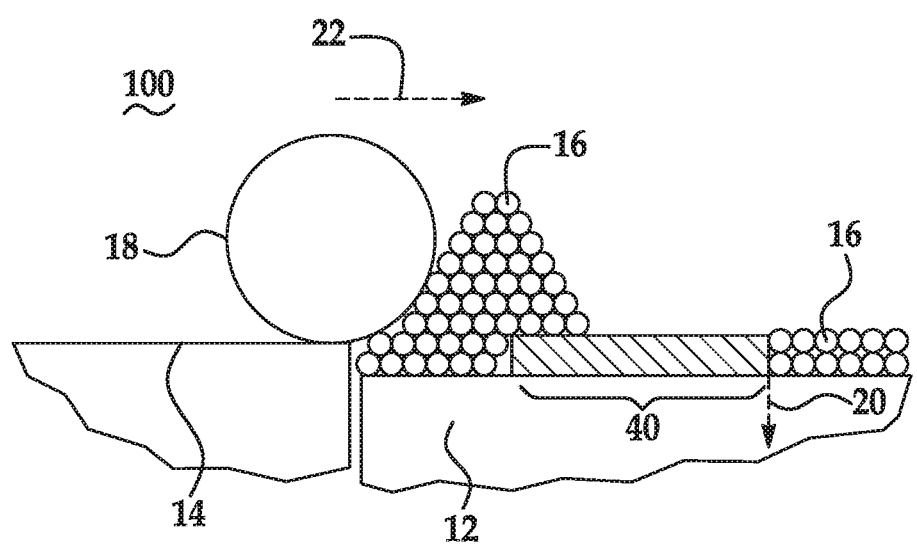

The build area platform 12 may be moved in a direction as denoted by the arrow 20, e.g., along the z-axis, so that metallic build material 16 may be delivered to the platform 12 or to a previously formed layer of the 3D part (see FIG. 2E). In an example, when the metallic build material particles 16 are to be delivered, the build area platform 12 may be programmed to advance (e.g., downward) enough so that the build material distributor 18 can push the metallic build material particles 16 onto the platform 12 to form a layer of the metallic build material 16 thereon (see, e.g., FIGS. 2A and 2B). The build area platform 12 may also be returned to its original position, for example, when a new part is to be built.

The build material supply 14 may be a container, bed, or other surface that is to position the metallic build material particles 16 between the build material distributor 18 and the build area platform 12. In some examples, the build material supply 14 may include a surface upon which the metallic build material particles 16 may be supplied, for instance, from a metallic build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the metallic build material particles 16 from a storage location to a position to be spread onto the build area platform 12 or onto a previously formed layer of the 3D part.

The build material distributor 18 may be moved in a direction as denoted by the arrow 22, e.g., along the y-axis, over the build material supply 14 and across the build area platform 12 to spread a layer of the metallic build material 16 over the build area platform 12. The build material distributor 18 may also be returned to a position adjacent to the build material supply 14 following the spreading of the metallic build material 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller.

As shown in FIG. 1, the printing system 10 also includes an applicator 28, which may contain the positive masking agent 38 (shown in FIG. 2C) disclosed herein. The applicator 28 may be scanned across the build area platform 12 in the direction indicated by the arrow 30, e.g., along the y-axis. The applicator 28 may be, for instance, an inkjet applicator, such as a thermal inkjet printhead, a piezoelectric printhead, etc., and may extend a width of the build area platform 12. While a single applicator 28 is shown in FIG. 1, it is to be understood that multiple applicators 28 may be used that span the width of the build area platform 12. Additionally, the applicators 28 may be positioned in multiple printbars. The applicator 28 may also be scanned along the x-axis, for instance, in configurations in which the applicator 28 does not span the width of the build area platform 12 to enable the applicator 28 to deposit the positive masking agent 38 over a large area of a layer of the metallic build material 16. The applicator 28 may thus be attached to a moving XY stage or a translational carriage (neither of which is shown) that moves the applicator 28 adjacent to the build area platform 12 in order to deposit the positive masking agent 38 in predetermined areas of a layer of the metallic build material 16 that has been spread on the build area platform 12. The applicator 28 may include a plurality of nozzles (not shown) through which the positive masking agent 38 is to be ejected.

The printing system 10 also includes a spatially broad, high energy light source 24. The spatially broad, high energy light source 24 may be used to simultaneously expose the entire layer of metallic build material 16 on the build material platform 12 to radiation. In one example, the spatially broad, high energy light source 24 may be a continuous wave discharge lamp including xenon, argon, neon, krypton, sodium vapor, metal halide, or mercury-vapor. In another example, the spatially broad, high energy light source 24 may be an array of pulse lasers, continuous wave lasers, light-emitting diode (LED) lasers, or a combination thereof. In this example, the array may produce a uniformly dispersed beam. In still another example, the spatially broad, high energy light source 24 may be a flash discharge lamp including xenon or krypton. In still another example, the spatially broad, high energy light source 24 may be a tungsten-halogen continuous wave lamp. In yet another example, the spatially broad, high energy light source 24 may be a synchrotron light source that emits light having a wavelength above 200 nm.

The spatially broad, high energy light source 24 is capable of emitting enough energy to fuse/melt the metallic build material 16 to which the positive masking agent 38 has been applied. When the spatially broad, high energy light source 24 is a single pulse light source, the spatially broad, high energy light source 24 may be capable of delivering from about 30 J to about 50 J per $cm^2$. The amount of energy the spatially broad, high energy light source 24 is capable of delivering may be less than 30 J per $cm^2$ when the spatially broad, high energy light source 24 is a multiple pulse light source, and may be greater than 50 J per $cm^2$ when the spatially broad, high energy light source 24 is a continuous wave light source.

While not shown, it is to be understood that the spatially broad, high energy light source 24 may be mounted on the moving XY stage or the translational carriage, either of which may or may not have the applicator 28 attached thereto. The spatially broad, high energy light source 24 may also be in a fixed position.

Each of these physical elements may be operatively connected to a controller 32 of the printing system 10. The controller 32 may control the operations of the build area platform 12, the build material supply 14, the build material distributor 18, the applicator 28, and the spatially broad, high energy light source 24. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. Although not shown, the controller 32 may be connected to the 3D printing system 10 components via communication lines.

The controller 32 manipulates and transforms data, which may be represented as physical (electronic) quantities within the printer's registers and memories, in order to control the physical elements to create the 3D part. As such, the controller 32 is depicted as being in communication with a data store 34. The data store 34 may include data pertaining to a 3D part to be printed by the 3D printing system 10. The data for the selective delivery of the metallic build material 16, the positive masking agent 38, etc. may be derived from a model of the 3D part to be formed. For instance, the data may include the locations on each layer of metallic build material 16 that the applicator 28 is to deposit the positive masking agent 38. In one example, the controller 32 may use the data to control the applicator 28 to selectively apply the positive masking agent 38. The data store 34 may also include machine readable instructions (stored on a non-transitory computer readable medium) that are to cause the controller 32 to control the amount of metallic build material 16 that is supplied by the build material supply 14, the movement of the build area platform 12, the movement of the build material distributor 18, the movement of the applicator 28, the amount of radiation supplied by the spatially broad, high energy light source 24, etc.

As shown in FIG. 1, the printing system 10 may also include a low energy light source 26 or a heater 27. The low energy light source 26 or the heater 27 may be used to preheat the metallic build material 16. The low energy light source 26 or the heater 27 may also be used to evaporate a solvent (e.g., aqueous or non-aqueous vehicle) of the positive masking agent 38. When the radiation absorption amplifier is a metal salt, the low energy light source 26 or the heater 27 may also be used to decompose the metal salt to a metal.

In some examples, the low energy light source 26 is used. The low energy light source 26 may be capable of delivering, to the metallic build material 16, from about 1% to about 20% of the amount of energy the spatially broad, high energy light source 24 is capable of delivering to the metallic build material 16. The low energy light source 26 may be a radiative heat source that is positioned to heat each layer 36 (see FIG. 2C) after the positive masking agent 38 has been applied thereto and prior to exposing the metallic build material 16 to radiation from the spatially broad, high energy light source 24. In the example shown in FIG. 1, the low energy light source 26 is attached to the side of the applicator 28, which allows for printing and heating in a single pass. Alternatively, the low energy light source 26 could be in a fixed position that is capable of heating the entire layer 36 at once.

In other examples, the heater 27 is used. The heater 27 may be a conventional furnace or oven or an infrared (IR) light source. In an example, the heater 27 may be integrated into the build material platform 12. This type of heater 27 may be used for heating the metallic build material layer 16 before or after the positive masking agent 38 is applied and prior to exposing the metallic build material 16 to radiation from the spatially broad, high energy light source 24.

Referring now to FIGS. 2A through 2E, an example of the 3D printing method 100 is depicted. Prior to execution of the method 100 or as part of the method 100, the controller 32 may access data stored in the data store 34 pertaining to a 3D part that is to be printed. The controller 32 may determine the number of layers of metallic build material 16 that are to be formed, and the locations at which the positive masking agent 38 from the applicator 28 is to be deposited on each of the respective layers.

As shown in FIGS. 2A and 2B, the method 100 includes applying the metallic build material 16. In FIG. 2A, the build material supply 14 may supply the metallic build material particles 16 into a position so that they are ready to be spread onto the build area platform 12. In FIG. 2B, the build material distributor 18 may spread the supplied metallic build material particles 16 onto the build area platform 12. The controller 32 may execute control build material supply instructions to control the build material supply 14 to appropriately position the metallic build material particles 16, and may execute control spreader instructions to control the build material distributor 18 to spread the supplied metallic build material particles 16 over the build area platform 12 to form a layer 36 of metallic build material particles 16 thereon. As shown in FIG. 2B, one layer 36 of the metallic build material particles 16 has been applied.

The layer 36 has a substantially uniform thickness across the build area platform 12. In an example, the thickness of the layer 36 ranges from about 20 μm to about 100 μm, although thinner or thicker layers may also be used. For example, the thickness of the layer 36 may range from about 20 μm to about 300 μm, or from about 30 μm to about 200 μm. Depending upon the desired thickness for the layer 36 and the particle size of the metallic build material 16, the layer 36 that is formed in a single build material application may be made up of a single row of metallic build material particles 16 or multiple rows of metallic build material particles 16 (as shown in FIG. 2B).

The metallic build material 16 may be any metallic material. In an example, the metallic build material 16 may be a powder.

Single elements or alloys may be used as the metallic build material 16. The single element build material may be interacted (e.g., reacted, alloyed, etc.) with one or more other elements (e.g., a radiation absorption amplifier or a product of the decomposition of a radiation absorption amplifier) to form an alloy. Alternatively, the single element build material may be used to form a single element part with a radiation absorption amplifier that is or decomposes to the same element as the single element build material. The alloy build material is a starting alloy powder, i.e., a combination of elements that acts as a starting point from which the final alloy is created. The final alloy may be the same alloy as the starting alloy (i.e., when the radiation absorption amplifier is or decomposes to the same alloy as the starting alloy or to one of the elements in the combination of elements) or a distinct alloy (i.e., when the radiation absorption amplifier is or decomposes to an element other than those in the combination of elements or an alloy that is different than the starting alloy).

Some examples of the metallic build material 16 include steels, stainless steel, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, Maraging-Steel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloy build materials may be used.

The metallic build material 16 may have a melting point ranging from about 200° C. to about 3500° C.

The metallic build material 16 may be made up of similarly sized particles or differently sized particles. In the examples shown herein (FIG. 1 and FIGS. 2A-2E), the metallic build material 16 includes similarly sized particles. The term "size", as used herein with regard to the metallic build material 16, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the metallic build material 16 may be greater than 5 μm and may be up to about 100 μm. Substantially spherical particles of this particle size have good flowability and can be spread relatively easily. As another example, the average size of the particles of the metallic build material 16 ranges from about 1 µm to about 100 µm. As still another example, the average size of the particles of the metallic build material 16 ranges from 20 µm to about 60 µm.

Referring now to FIG. 2C, the method 100 continues by selectively applying the positive masking agent 38 on a portion 40 of the metallic build material 16. As illustrated in FIG. 2C, the positive masking agent 38 may be dispensed from the applicator 28.

The controller 32 may execute instructions to control the applicator 28 (e.g., in the directions indicated by the arrow 30) to deposit the positive masking agent 38 onto predetermined portion(s) 40 of the metallic build material 16 that are to become part of the 3D part. The applicator 28 may be programmed to receive commands from the controller 32 and to deposit the positive masking agent 38 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 2C, the applicator 28 selectively applies the positive masking agent 38 on those portion(s) 40 of the layer 36 that are to be fused to become the first layer of the 3D part. As an example, if the 3D part that is to be formed is to be shaped like a cube or cylinder, the positive masking agent 38 will be deposited in a square pattern or a circular pattern (from a top view), respectively, on at least a portion of the layer 36 of the metallic build material particles 16. In the example shown in FIG. 2C, the positive masking agent 38 is deposited in a square pattern on the portion 40 of the layer 36 and not on the portions 42.

As mentioned above, the positive masking agent 38 includes the radiation absorption amplifier and the liquid vehicle. When the positive masking agent 38 is selectively applied in the desired portion(s) 40, the radiation absorption amplifier amplifies the radiation absorption of the portion(s) 40 of the metallic build material 16 in contact with the positive masking agent 38.

The volume or thickness of the positive masking agent 38 that is applied per unit of the metallic build material 16 in the patterned portion 40 may be sufficient to amplify the radiation absorption of the portion 40 so that the metallic build material 16 (and the radiation absorption amplifier or the product of the decomposition of the radiation absorption amplifier) in the patterned portion 40 will melt/fuse. The volume or thickness of the positive masking agent 38 that is applied per unit of the metallic build material 16 in the patterned portion 40 may also be sufficient to create the desired composition of the layer 36. The volume or thickness of the positive masking agent 38 that is applied per unit of the metallic build material 16 may depend, at least in part, on the radiation absorption amplifier used, the metallic build material 16 used, and the 3D part to be formed. In an example, the thickness of the positive masking agent 38 that is applied per unit of the metallic build material 16 may range from about 10 nm to about 10 µm. When the radiation absorption amplifier used has a high absorbance, the thickness of the positive masking agent 38 that is applied per unit of the metallic build material 16 may be about 10 nm. When the radiation absorption amplifier used modifies the surface topography of the metallic build material, the thickness of the positive masking agent 38 that is applied per unit of the metallic build material 16 may range from about 100 nm to about 1 µm.

It is to be understood that portions 42 of the metallic build material 16 that do not have the positive masking agent 38 applied thereto do not absorb enough radiation to melt/fuse. As such, these portions 42 do not become part of the 3D part that is ultimately formed. The metallic build material 16 in portions 42 may be reclaimed to be reused as build material in the printing of another 3D part.

When the positive masking agent 38 is applied on the metallic build material 16, it is to be understood that the positive masking agent 38 may reside at the top of the layer 36 or may partially penetrate the layer 36. The level of saturation/penetration may depend, at least in part, on the layer thickness, the particle size of the metallic build material 16 particles, the volume or thickness of the positive masking agent 38 that is applied, and the liquid vehicle used in the positive masking agent 38. If the radiation absorption amplifier of the positive masking agent 38 has an absorbance that is significantly higher than that of the metallic build material 16, some level of saturation/penetration may be desirable so that the radiation absorption amplifier may more evenly and efficiently transfer the thermal energy from the absorbed and converted radiation. If the radiation absorption amplifier of the positive masking agent 38 is selected to modify the surface topography of the metallic build material 16, it may be desirable for the positive masking agent 38 to reside at the top of the layer 36 so that the radiation absorption amplifier may form a porous metallic coating or a rough surface coating of metal nanoparticles.

In some examples of the 3D printing method 100, the layer 36 is exposed to radiation from the low energy light source 26 or is heated by the heater 27 prior to exposure to radiation from the spatially broad, high energy light source 24. The radiation from the low energy light source 26 or the heat from the heater 27 may heat the metallic build material 16 and or the positive masking agent 38 to a temperature ranging from about 150° C. to about 400° C.

The controller 32 may execute instructions to control the low energy light source 26 to expose the layer 36 to radiation. The low energy light source 26 may be programmed to receive commands from the controller 32 and to expose the layer 36 to radiation. In another example, the controller 32 may execute instructions to control the heater 27 to heat the layer 36, and the heater 27 may be programmed to receive commands from the controller 32 and to heat the layer 36.

As shown in FIG. 2C, the low energy light source 26 may be attached to the applicator 28, and the layer 36 may be exposed to radiation from the low energy light source 26 in the same pass that applies the positive masking agent 38. In other examples (not shown) the layer 36 may be exposed to radiation from the low energy light source 26 or heated by the heater 27, prior to or after the selective application of the positive masking agent 38.

In an example, the layer 36 may be exposed to radiation from the low energy light source 26 or heated by the heater 27 prior to the selective application of the positive masking agent 38 in order to preheat the metallic build material 16 and reduce the amount of radiation that will be used to melt/fuse the metallic build material 16 (and the radiation absorption amplifier or the product of the decomposition of the radiation absorption amplifier). In another example, the layer 36 may be exposed to radiation from the low energy light source 26 or heated by the heater 27 after the selective application of the positive masking agent 38 in order to evaporate the liquid vehicle or a solvent of the liquid vehicle. Residual liquid that is still present (i.e., not evaporated) when the metallic build material 16 is exposed to radiation from the spatially broad, high energy light source 24 may boil and cause a local vapor explosion when it is exposed to the radiation from the spatially broad, high energy light source 24, which may damage the fused layer.

In still another example, the layer 36 may be exposed to radiation from the low energy light source 26 or heated by the heater 27, after the selective application of the positive masking agent 38 in order to decompose the radiation absorption amplifier to modify the surface topography of the metallic build material 16 (e.g., the metal salt decomposing to form a porous metal coating on the metallic build material 16).

In some of these examples, the layer 36 is exposed to radiation from the low energy light source 26 or is heated by the heater 27 in an environment containing an inert gas, a low reactivity gas, or a reducing gas. As previously described, the inert gas or the low reactivity gas may be used to facilitate the decomposition of the radiation absorption amplifier (e.g., metal salt) and reduce the possibility of alternate reactions, while the reducing gas may aid in decomposing the metal salt. The inert gas, the low reactivity gas, or reducing gas may be contained in the environment around the build area platform 12.

As shown in FIG. 2D, after the positive masking agent 38 is selective applied and/or the layer 36 is exposed to radiation from the low energy light source 26 or is heated by the heater 27, the entire layer 36 of the metallic build material 16 is exposed to radiation from the spatially broad, high energy light source 24.

The controller 32 may execute instructions to control the spatially broad, high energy light source 24 to expose the layer 36 to radiation, and the spatially broad, high energy light source 24 may be programmed to receive commands from the controller 32 and to expose the layer 36 to radiation.

In an example the radiation from the high energy light source 24 has a wavelength greater than 200 nm.

The length of time for which the radiation is applied by the spatially broad, high energy light source 24, or energy exposure time, may be dependent, for example, on one or more of: characteristics of the spatially broad, high energy light source 24; characteristics of the metallic build material 16; characteristics of the positive masking agent 38; and/or whether the layer 36 of metallic build material 16 was exposed to radiation from the low energy light source 26 or heated by the heater 27. In an example, the energy exposure time ranges from about 10 microseconds to about 10 seconds. The upper limit of this range may be suitable for continuous wave light sources 24. In another example, the energy exposure time ranges from about 10 microseconds to about 100 milliseconds (0.1 seconds).

Exposing the layer 36 of metallic build material 16 to radiation from the spatially broad, high energy light source 24, causes i) the metallic build material 16 upon which the positive masking agent 38 is applied (i.e., the metallic build material 16 in the portion(s) 40) and ii) either the radiation absorption amplifier or the product of the decomposition of the radiation absorption amplifier to melt/fuse. The radiation absorption amplifier may absorb the radiation, convert the radiation to thermal energy, and transfer the thermal energy to the metallic build material 16 and/or the product of the decomposition of the radiation absorption amplifier may absorb the radiation, convert the radiation to thermal energy, and transfer the thermal energy to the metallic build material 16. The thermal energy converted from the radiation applied by the spatially broad, high energy light source 24 may be sufficient to elevate the temperature of the metallic build material particles 16 above their melting point. The thermal energy converted from the radiation applied by the spatially broad, high energy light source 24 also be sufficient to elevate the temperature of the radiation absorption amplifier or the product of the decomposition of the radiation absorption amplifier above its melting point.

As shown in FIG. 2D, the portions of the metallic build material 16 to which the positive masking agent 38 is not applied (i.e., portion(s) 42) do not melt/fuse. The unpatterned portions 42 are unable to absorb and convert enough radiation to thermal energy to melt/fuse.

In some examples, the radiation from the spatially broad, high energy light source 24 may also cause the radiation absorption amplifier or the product of the decomposition of the radiation absorption amplifier to interact with the metallic build material 16 to form an alloy. For example, when the radiation absorption amplifier is carbon black and the metallic build material 16 is iron, the radiation absorption amplifier can perform three actions. The radiation absorption amplifier can act as a solute and be dissolved in the ferrite phase of iron as a solid solution. If the carbon concentration exceeds the maximum concentration for the solid solution of carbon in ferrite, an iron carbide phase precipitates according to the following reaction (I):

$$C + Fe \rightarrow Fe_xC_y \quad (I)$$

to produce a 2 phase Fe—$Fe_xC_y$ alloy. The most common $Fe_xC_y$ phase is $Fe_3C$, also known as cementite, although other stoichiometries may occur. It is also possible under rapid cooling conditions to suppress the formation of the $Fe_xC_y$ in a supersaturated ferrite and form a phase called martensite.

In another example, the radiation absorption amplifier undergoes a decomposition reaction that generates the product of the decomposition of the radiation absorption amplifier and a gaseous byproduct. As an example, when the radiation absorption amplifier is copper (II) formate, exposure to radiation may initiate the following reaction (II):

$$Cu(HCOO)_2 \rightarrow Cu_{(s)} + HCOOH_{(g)} + CO_{2(g)} \quad (II)$$

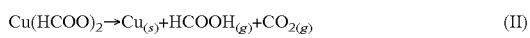

to produce solid copper (the product of the decomposition of the radiation absorption amplifier), formic acid gas, and carbon dioxide gas. When the metallic build material 16 is not copper, exposure to radiation may initiate an alloying reaction (between the generated copper and the metallic build material 16) to produce an alloy.

While not shown, some examples of the method 100 may further include high temperature processing of the metallic build material 16 after the portion(s) 40 of the metallic build material 16 melt/fuse. The high temperature processing may be used to distribute the radiation absorption amplifier or the product of the decomposition of the radiation absorption amplifier in an optimal fashion (e.g., in a configuration suitable for the formation of the desired alloy). Examples of the high temperature processes include heat treatment and sintering.

The processes shown in FIGS. 2A through 2D may be repeated to iteratively build up several melted/fused layers and to form the 3D printed part.

FIG. 2E illustrates the initial formation of a second layer of metallic build material particles 16 on the previously formed layer. In FIG. 2E, following the melting/fusing of the predetermined portion(s) 40 of the layer 36 of metallic build material 16, the controller 32 may execute instructions to cause the build area platform 12 to be moved a relatively small distance in the direction denoted by the arrow 20. In other words, the build area platform 12 may be lowered to enable the next layer of metallic build material particles 16 to be formed. For example, the build material platform 12 may be lowered a distance that is equivalent to the height of the layer 36. In addition, following the lowering of the build area platform 12, the controller 32 may control the build material supply 14 to supply additional metallic build material particles 16 (e.g., through operation of an elevator, an auger, or the like) and the build material distributor 18 to form another layer of metallic build material particles 16 on top of the previously formed layer with the additional metallic build material 16. The newly formed layer may be patterned with the positive masking agent 38, in some instances exposed to radiation from the low energy light source 26 or heated by the heater 27, and then exposed to radiation from the spatially broad, high energy light source 24 to form the additional melted/fused layer.

To further illustrate the present disclosure, an example is given herein. It is to be understood that this example is provided for illustrative purposes and is not to be construed as limiting the scope of the present disclosure.

EXAMPLE

An example of the positive masking agent was prepared. The radiation absorption amplifier used was copper formate tetrahydrate. The copper formate tetrahydrate was dissolved in water at a concentration of 10 wt %.

The example positive masking agent was applied on a substrate with a micropipette, and dried in air on a hotplate at 70° C. for 10 minutes to evaporate the water. The dried example positive masking agent was then transferred to a glovebox and heated by high intensity IR radiation for 20 seconds in nitrogen gas. The high intensity IR radiation used had a wavelength from about 1.5 µm to about 2.5 µm and was supplied by IR lamps. The high intensity IR radiation heated the dried example positive masking agent to about 260° C.

Figure 3:
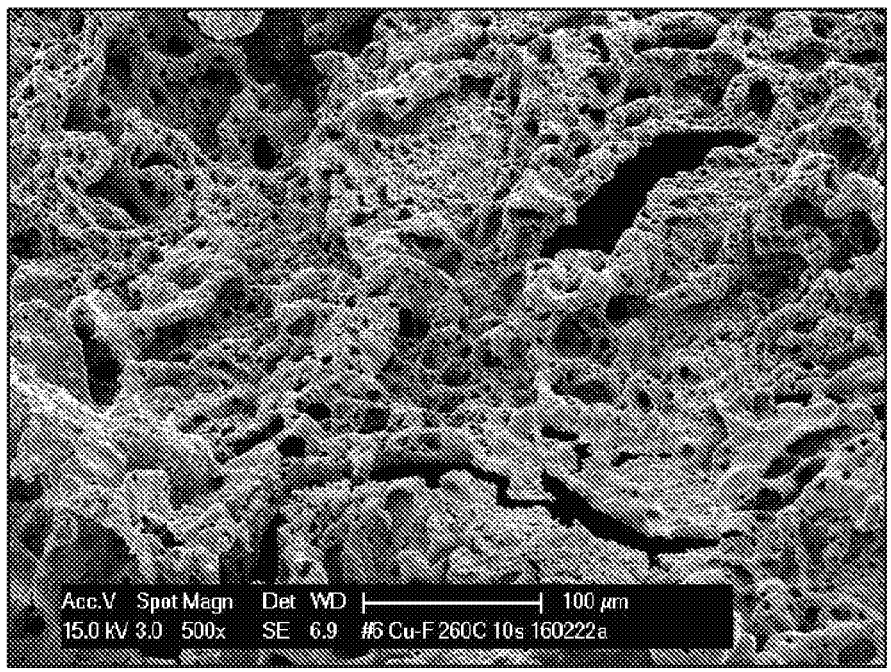
FIG. 3 is a scanning electron microscope ("SEM") image, using a scalar bar of 100 μm, of a product of the decomposition of an example of the radiation absorption amplifier disclosed herein.

The dried example positive masking agent, containing copper formate tetrahydrate, decomposed to porous copper. A SEM image was taken of the porous copper. This is shown in FIG. 3. FIG. 3 clearly illustrates the porous nature of the copper coating formed after the example positive masking agent, containing copper formate tetrahydrate, was dried and exposed to radiation.

The example positive masking agent was also mixed with copper powder having a nominal particle size of 50 µm. The mixture was dried in air on a hotplate at 70° C. for 10 minutes to evaporate the water, and then the mixture was exposed to high intensity IR radiation for 30 seconds in nitrogen gas. The high intensity IR radiation used had a wavelength from about 1.5 µm to about 2.5 µm and was supplied by IR lamps. The mixture was heated to about 260° C. by the high intensity IR radiation.

Figure 4:
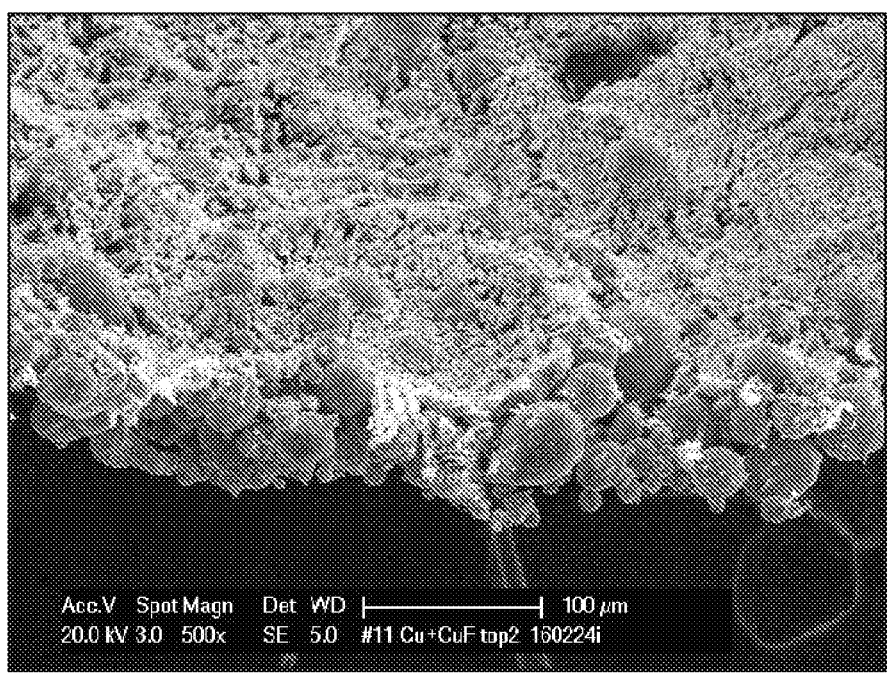
FIG. 4 is a SEM image, using a scalar bar of 100 μm, of a coating of a product of the decomposition of an example of the radiation absorption amplifier disclosed herein.

The example positive masking agent, containing copper formate tetrahydrate, formed a porous copper coating over the top of the copper powder. A SEM image was taken of the porous copper coating over the copper powder. This is shown in FIG. 4. FIG. 4 clearly illustrates the porous coating formed over the copper powder after the example positive masking agent, containing copper formate tetrahydrate, was mixed with the copper powder and exposed to radiation to heat the copper formate above its decomposition temperature.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 wt % to about 50 wt % should be interpreted to include the explicitly recited limits of about 1 wt % to about 50 wt %, as well as individual values, such as 2 wt %, 25.5 wt %, etc., and sub-ranges, such as from about 15 wt % to about 35 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
   applying a metallic build material;
   selectively applying a positive masking agent including a solvent and a radiation absorption amplifier on at least a portion of the metallic build material, the radiation absorption amplifier being compatible with the metallic build material, wherein the radiation absorption amplifier is a metal salt; and
   one of:
      exposing the metallic build material to radiation from a low energy light source, thereby evaporating the solvent; or
      heating the metallic build material, thereby evaporating the solvent; and
   after evaporating the solvent, exposing the metallic build material to radiation from a spatially broad, high energy light source, thereby melting the portion of the metallic build material in contact with the positive masking agent to form a layer;
   wherein one of:
      i) the radiation absorption amplifier has an absorbance for the radiation that is higher than an absorbance for the radiation of the metallic build material; or
      ii) the radiation absorption amplifier modifies a surface topography of the at least the portion of the metallic build material to reduce specular reflection of the radiation off of the at least the portion of the metallic build material; or
      both i) and ii); and
   wherein one of:
      in response to the exposing of the metallic build material to the radiation from the low energy light source, the metal salt modifies the surface topography of the at least the portion of the metallic build material by decomposing to a metal, thereby forming a porous coating of the metal on the at least the portion of the metallic build material; or
      in response to the heating of the metallic build material, the metal salt modifies the surface topography of the at least the portion of the metallic build material by decomposing to a metal, thereby forming a porous coating of the metal on the at least the portion of the metallic build material.

2. The method as defined in claim 1 wherein the metal salt is copper formate, nickel formate, copper oxalate, nickel oxalate, cobalt oxalate, iron oxalate, or a combination thereof.

3. The method as defined in claim 1 wherein the decomposing of the metal salt to the metal is accomplished at a temperature ranging from about 150° C. to about 400° C. and in an environment containing an inert gas, a low reactivity gas, or a reducing gas.

4. The method as defined in claim 1 wherein the radiation absorption amplifier is compatible with the metallic build material by being or decomposing to a metallic material that is the same as the metallic build material.

5. The method as defined in claim 1 wherein the radiation absorption amplifier is compatible with the metallic build material by being or decomposing to a material that forms an alloy with the metallic build material.

6. The method as defined in claim 1 wherein the selectively applying of the positive masking agent is accomplished by thermal inkjet printing or piezoelectric inkjet printing.

7. The method as defined in claim 1 wherein the spatially broad, high energy light source is one of:
- a continuous wave discharge lamp including xenon, argon, neon, krypton, sodium vapor, metal halide, or mercury-vapor; or
- an array of pulse lasers, continuous wave lasers, light-emitting diode (LED) lasers, or a combination thereof; or
- a flash discharge lamp including xenon or krypton; or
- a tungsten-halogen continuous wave lamp; or
- a synchrotron light source that emits light having a wave length above 200 nm.

8. The method as defined in claim 1 wherein the exposing of the metallic build material to radiation from the spatially broad, high energy light source is accomplished in a time period ranging from about 10 microseconds to about 10 seconds.

9. The method as defined in claim 1 wherein the metallic build material is applied in a layer having a thickness ranging from about 20 μm to about 100 μm.

10. The method as defined in claim 1 wherein:
- the spatially broad, high energy light source is a single pulse light source capable of delivering from about 30 J per $cm^2$ to about 50 J per $cm^2$ to the metallic build material; or
- the spatially broad, high energy light source is a multiple pulse light source capable of delivering less than 30 J per $cm^2$ to the metallic build material; or
- the spatially broad, high energy light source is a continuous wave light source capable of delivering greater than 50 J per $cm^2$ to the metallic build material.

* * * * *